Feb. 2, 1965 I. SZALAY 3,168,716

VARIABLE INDUCTOR

Filed Oct. 31, 1961

STARTING POSITION

L MAX$=L_1+L_2+2M$

UPPER CORE ROTATED 90°

L MED$=L_1+L_2$

UPPER CORE ROTATED 180°

L MIN$=L_1+L_2-2M$

INVENTOR
ISTVAN SZALAY

BY I. David Blumenfeld

ATTORNEY

United States Patent Office 3,168,716
Patented Feb. 2, 1965

3,168,716
VARIABLE INDUCTOR
Istvan Szalay, Lynchburg, Va., assignor to General Electric Company, a corporation of New York
Filed Oct. 31, 1961, Ser. No. 148,980
5 Claims. (Cl. 336—120)

This invention relates to inductive devices and more particularly to compact, minaturized, variable inductance devices adapted for use as transformers, reactors, inductors and coils.

In designing compact, light-weight electronic circuits, it is obvious that the size and weight of the individual circuit components must be reduced to a minimum. In two way radio equipment, of the type designed to be carried by or on the person of an individual, the problem is particularly acute, since the equipment should be small enough and light enough to be easily carried by hand. The use of transistors in place of vacuum tubes has, of course, been of great help in this connection; unfortunately, however, the use of transistors has not completely solved the space-weight problem and further effort in miniaturizing other circuit components is necessary if a light weight, compact, portable two way radio is to be achieved.

Since such radio equipment includes a plurality of tuned resonant circuits, consisting of inductors and capacitors, at least one of which is variable, miniaturization of these components offers the best opportunity for further weight and size reduction. It is obvious that the most difficult problem faced here is miniaturizing the variable element of the resonant circuit. Heretofore, variable inductors were so bulky and complex that capacitors, though they also left much to be desired from the spaceweight standpoint, usually made the variable element in the circuit. Because of advances made in the field of magnetic materials, it has now become possible to construct variable inductors which offer many advantages in terms of size, weight, cost, etc., over utilizing variable capacitors in resonant circuits. While compact variable inductors have been constructed which are lighter and smaller than those heretofore available, and while these are useful for many purposes, they have a number of shortcomings which substantially limit their usefulness. For example, it has been found difficult to maintain the quality factor (Q) and the inductance (L) of such devices constant. Furthermore, it is often quite difficult to maintain the mechanical stability of these compact inductors during operation.

Therefore, one of the principal objectives of this invention is to provide an improved variable inductor having a substantially constant Q over the entire range of inductance values.

Another objective of this invention is to provide a high Q variable inductor or small size, little weight, and low cost.

A further objective of this invention is to provide an improved variable inductor which has good mechanical stability characteristics.

Other objectives and advantages of this invention will become apparent as the description thereof proceeds.

The various objectives and advantages of this invention may be achieved by providing a pair of toroidal cores including central leg members which support a pair of serially connected coils. The cores are maintained in an abutting superposed relation so that relative rotational movement of the cores changes the inductance of the device.

The novel features which are believed to be characteristic of this invention are set forth with particularity in the appended claims. The invention itself, however, both as to its organization and method of operation, may best be understood by reference to the following description taken in connection with the accompanying drawing wherein:

Figure 3A:
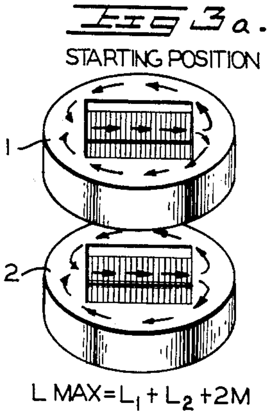
Figure 3B:
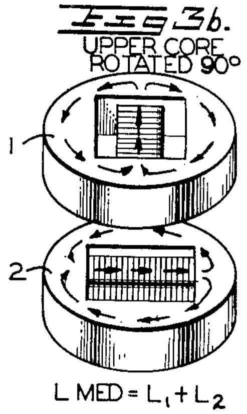
Figure 3C:
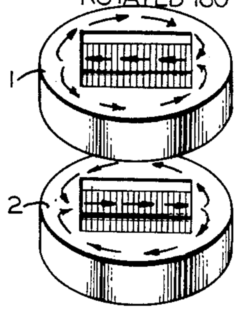

FIG. 3*a* is a schematic illustration of the inductor coils showing the relationship of the magnetic fields in the respective cores;

FIG. 3*b* is a schematic illustration of the cores in a different position and the effect thereof on the magnetic fields;

FIG. 3*c* is a schematic illustration of the cores in yet a third position and the corresponding effect on the magnetic fields.

Figures 1, 2:
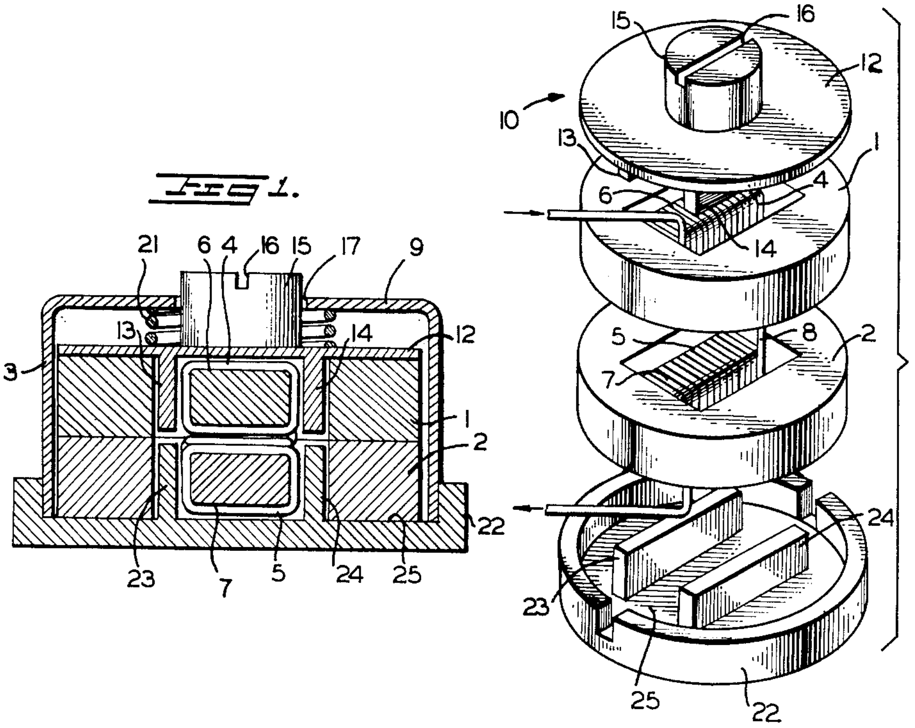
FIG. 1 is a cross-sectional view of a variable inductor assembly constructed in accordance with one embodiment of this invention.
FIG. 2 is an exploded view of the variable inductor assembly with the windings shown in schematic form and the outer casing deleted.

One embodiment of the present invention is illustrated in FIGS. 1 and 2 of the drawing and includes a pair of magnetic cores 1 and 2 positioned in an abutting relationship in a housing 3. The core members are fabricated of any suitable magnetic material, e.g., ferrites, powdered iron, etc., and are toroids having center leg members 4 and 5. Coils 6 and 7 are wound on these leg members and are electrically connected in series to establish the magnetic flux carried by the cores. The mutual inductances of the individual coils and hence the inductance of the device as a whole is varied by rotating the cores with respect to each other. Rotation of cores 1 and 2 relative to each other is achieved by a control means shown generally at 10 which includes a disc 12 that fits over and engages core 1 when the device is assembled. Projections 13 and 14 extend from disc 12 and fit into openings between core 1 and leg member 4. A slotted shaft 15 is attached to disc 12 and projects through an opening in end wall 9 of housing 3 to facilitate rotation of the control means and core 1 by a screw driver or a similar adjusting tool. A spring 21, seen most clearly in FIG. 1, surrounds shaft 15 and is compressed between housing 3 and disc 12, thereby compressing cores 1 and 2 and maintaining them in an abutting position. A snap cover 22 having projections 23 and 24 fits over the open end of housing 3 so that these projections fit between the opening in core 2 and leg member 5. Rotation of core 2 relative to core 1 may thus be achieved upon rotation of either shaft 15 or cover 22.

As current flows through coils 6 and 7, magnetic fields are established in cores 1 and 2. These cores are so constructed that a complete magnetic circuit is provided in each core. The nature of the flux path in these cores may be clearly observed in FIGS. 3*a*–3*c*, wherein the arrows represent the magnetic flux paths. The inductance ($L_T$) of the entire assembly is, therefore, equal to the sum of the self-inductances of coils 6 and 7 ($L_6+L_7$) and the sum of their mutual inductances ($M_6+M_7$). The degree of magnetic coupling between coils 6 and 7 may be selectively varied by rotation of cores 1 and 2 whereby the mutual inductances $M_6$ and $M_7$, and hence the total inductance $L_T$, varies correspondingly. This may be most readily understood by reference to FIGS. 3*a*–3*c*, which illustrate diagrammatically the relationship of the magnetic fields established by coils 6 and 7 for various positions of the cores. In FIG. 3*a*, cores 1 and 2 are shown in a position such that the flux lines cutting each coil due to the current in the other coil, are in the same direction as the flux lines of self-induction (i.e., flux established due to the current flowing in the same coil). The mutual inductances of the two coils are, therefore, maximum and add to the sum of the self-inductances of these coils. Thus, the inductance of the entire assembly for the position shown in FIG. 3*a* is a maximum value, i.e., $L_T=(L_6+M_6)+(L_7+M_7)$.

With core 1 rotated 90° with respect to core 2, the condition shown in FIG. 3*b*, the magnetic coupling between the two coils is zero since the flux lines due to current flowing in coil 7 do not cut the windings of coil 6 and similarly, the flux established by current flow in coil 6 has no effect on coil 7. The mutual inductances $M_6$ and $M_7$ are, therefore, zero. In this position, the total inductance $L_T$ is at a value less than maximum (i.e., $L_T=L_6+L_7$). In FIG. 3*c*, core 1 is rotated 180° with respect to core 2. As a result, the flux lines cutting each coil due to the current in the other coil are in the opposite direction and subtract from the flux lines of self-induction (those due to current flowing in the same coil).

The mutual inductances therefore subtract from the self-inductances $L_6$ and $L_7$. The total inductance for the assembly is therefore at a minimum, i.e., $$L_T=(L_6-M_6)+(L_7-M_7)$$

By thus rotating one core with respect to the other, a variation in inductance is achieved from a maximum value, through intermediate values, to a minimum.

In order to substantiate the efficacy of this arrangement in achieving a variable inductor by means of an assembly constructed in accordance with that shown in FIG. 1, an inductor assembly was constructed which utilized ferrite core elements approximately .33 in. in diameter and .13 in. in height. 10 turns of #32 were wound on the center leg. A signal of 7.9 mc. was impressed on the device and inductance variations from 5.9 microhenries to 8.8 microhenries, and Q factor variations from 176 to 187 were observed with rotation of the cores. Thus, the use of toroid shaped core members in variable inductors produces the desired result discussed earlier, i.e., a substantially constant quality factor Q over the entire range of inductances.

The embodiment of the device illustrated in FIG. 1, might also be utilized as a transformer wherein $L_1$ and $L_2$ would be constant and coils 6 and 7 would be wound and separately connected on legs 4 and 5 to comprise the primary and secondary coils of the transformer. In an arrangement such as this a magnetic coupling factor K would change from a plus maximum value through zero to a minus maximum value by rotation of the upper core relative to the lower core. A transformer of this variable nature would be desirable for application as a variable feedback device in variable antenna coupling and band filters, etc. In this particular application, it might be desirable to add a grounding shield between the cores of the transformer and surround the cores with a grounding shield to separate them from other components of a particular circuit.

Although a particular embodiment of the subject invention has been described, many modifications may be made and it is understood to be the intention of the appended claims to cover all such modifications that fall within the true spirit and scope of the invention.

What is claimed as new and desired to be secured by Letters Patent of the United States is:

1. A variable inductance device comprising at least two toroidal shaped magnetic cores in superposed relation with their rotational axes parallel, each of said cores having openings therein defining a leg extending transversely to its rotational axis, each of said toroidal cores defining a complete, closed magnetic circuit, a coil wound on each leg to produce a separate magnetic field entirely within each of said cores when energized, and means to rotate one of said cores about it rotational axis relative to the other of said cores to vary the magnetic coupling of the cores and thereby the inductance of the device.

2. A variable inductance device comprising an enclosure containing at least two toroidal shaped magnetic cores in superposed relation with their rotational axis parallel, each of said cores having openings therein defining a leg extending transversely to its rotational axis, each of said toroidal cores defining a complete, closed magnetic circuit, a coil wound on each leg to produce a separate magnetic field entirely within each of said cores when energized, control means at one end of said enclosure in superposed relation and engaging one of said cores to rotate said core about its axis relative to the other of said cores to vary the magnetic coupling of the cores and thereby the inductance of the device and closure means at the other end of said enclosure to contain the cores within the enclosure.

3. A variable inductance device comprising a cylindrical enclosure containing at least two toroidal shaped cores in superposed relation with their rotational axis parallel and in juxtaposed relation with the sides of said enclosure, each of said cores having openings therein defining a leg extending transversely to its rotational axis, each of said toroidal cores defining a complete, closed magnetic circuit, a coil wound on each leg to produce a separate magnetic field entirely within each of said cores when energized, a cover on one end of said enclosure, prongs contained thereon to engage the openings of one of said cores, biased control means at the other end of said enclosure, prongs thereon to engage the openings of the other of said cores to rotate said core about its axis relative to the other core to vary the magnetic coupling of the cores and thereby the inductance of the device.

4. A variable inductance device comprising a cylindrical enclosure being opened at one end and having an apertured end wall at the other end, at least two toroidal shaped cores in superposed relation with their rotational axes parallel contained within said enclosure in juxtaposed relation with the inner walls of said enclosure, each of said cores having openings therein defining a leg extending transversely to its rotational axis, each of said toroidal cores defining a complete, closed magnetic circuit, a coil wound on each leg to produce a separate magnetic field entirely within each of said cores when energized, means connecting said coils in series, a closure means at the open end of said enclosure, prongs thereon to engage the openings in one of said cores, control means having an elongated head member passing through the aperture in said apertured end wall of the enclosure, prongs on said control means to engage the openings in the other of said cores to rotate one of said cores about its axis relative to the other core upon rotation of the elongated head member, spring biasing means positioned between the control means and the apertured end wall of said enclosure to compress said control means and thereby maintain said coils in continuous superposed relation.

5. A variable transformer comprising at least two toroidal shaped magnetic cores in superposed relation with their rotational axes parallel, each of said cores having openings therein defining a leg extending transversely to its rotational axis, each of said toroidal cores defining a complete, closed magnetic circuit, each leg having a separate coil wound thereon to produce a separate magnetic field entirely within each of said cores and at right angles to the axes of rotation of said cores, means to rotate one of said cores about its axis relative to the other of said cores to vary the magnetic coupling of said cores.

References Cited by the Examiner

UNITED STATES PATENTS

| | | | |
|---|---|---|---|
| 2,266,608 | 12/41 | Kuehni | 336—134 X |
| 2,585,050 | 2/52 | Simon | 336—120 X |
| 2,609,531 | 9/52 | Kirchner | 336—83 |

OTHER REFERENCES

Burnell: "Variable Toroidal Inductors," October 1954, 336–135 (pages 68, 69, 128 and 129), In Tele-Tech & Electronic Industries.

JOHN F. BURNS, *Primary Examiner.*